(12) United States Patent
Lin et al.

(10) Patent No.: US 10,871,914 B2
(45) Date of Patent: Dec. 22, 2020

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventors: Ping-Chuan Lin, Taipei (TW); Shii-Yeu Chern, Taipei (TW); Tai-Yuan Huang, New Taipei (TW); Yi-Hsuan Lin, New Taipei (TW); Chi-Shun Kao, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 34 days.

(21) Appl. No.: 16/278,172

(22) Filed: Feb. 18, 2019

(65) Prior Publication Data

US 2020/0210093 A1 Jul. 2, 2020

(30) Foreign Application Priority Data

Dec. 26, 2018 (TW) .............................. 107147162 A

(51) Int. Cl.
*G06F 3/06* (2006.01)
*G06F 12/00* (2006.01)

(52) U.S. Cl.
CPC .......... *G06F 3/0652* (2013.01); *G06F 3/0604* (2013.01); *G06F 3/0616* (2013.01); *G06F 3/0679* (2013.01); *G06F 12/00* (2013.01)

(58) Field of Classification Search
CPC ...... G06F 12/00; G06F 3/0604; G06F 3/0616; G06F 3/06779; G06F 3/0652
USPC .......................................................... 711/103
See application file for complete search history.

(56) References Cited

U.S. PATENT DOCUMENTS

| | | | | |
|---|---|---|---|---|
| 2010/0082883 | A1* | 4/2010 | Chen ................... | G06F 12/0246 711/103 |
| 2010/0115186 | A1* | 5/2010 | Chang ................. | G06F 12/0246 711/103 |
| 2013/0311705 | A1* | 11/2013 | Cheng ................. | G06F 12/0246 711/103 |
| 2014/0195725 | A1* | 7/2014 | Bennett ................ | G06F 12/06 711/103 |

* cited by examiner

*Primary Examiner* — Gautam Sain
(74) *Attorney, Agent, or Firm* — JCIPRNET

(57) ABSTRACT

A memory management method, a memory storage device and a memory control circuit unit are provided. The method includes: storing first data to a first physical erasing unit and marking the first physical erasing unit as belonging to a first group, wherein the first data belongs to a first type; storing second data to a second physical erasing unit and marking the second physical erasing unit as belonging to a second group, wherein the second data belongs to a second type which is different from the first type; selecting a third physical erasing unit as an active physical erasing unit and marking the third physical erasing unit as belonging to the first group; when a data moving operation is performed, moving valid data of the first physical erasing unit to the third physical erasing unit according to a first parameter of the first physical erasing unit.

12 Claims, 12 Drawing Sheets

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 107147162, filed on Dec. 26, 2018. The entirety of the above-mentioned patent application is hereby incorporated by reference herein and made a part of this specification.

BACKGROUND

Technical Field

The present invention relates to a memory management technique, and more particularly, to a memory management method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

The memory storage device can select one physical block (a.k.a. an active physical erasing unit) from a spare area to store data from a host system. For example, after the active physical erasing unit is selected, the data from the host system will be received and stored in this active physical erasing unit before the active physical erasing unit is fully written. After the current active physical erasing unit is fully written, another physical block will be selected from the spare area as a new active physical erasing unit to continually store the data from the host system. In general, when the number of the physical blocks in the spare area of the memory storage device is insufficient, a garbage collection procedure may be used to perform a data moving operation on valid data stored in the physical blocks in the spare area and release a physical block to the spare area.

During a continuous writing of the data from the host system, the memory storage device can periodically update a file system, and logical addresses of the updated file system are usually not the addresses for the continuous writing of the data. Consequently, after the active physical erasing unit is fully written by the continuous writing, the active physical erasing unit will randomly generate invalid data due to the frequently updated file system such that the efficiency of performing garbage collection will be reduced when the garbage collecting program is subsequently executed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

According to an exemplary embodiment, a memory management method for a rewritable non-volatile memory module is provided. The rewritable non-volatile memory module includes a plurality of physical erasing units. The method includes: retrieving at least one physical erasing unit from the physical erasing units as a first physical erasing unit for storing first data corresponding to a write command of a host system to the first physical erasing unit and marking the first physical erasing unit as belonging to a first group, wherein the first data belongs to a first type; retrieving at least one physical erasing unit from the physical erasing units as a second physical erasing unit for storing second data corresponding to another write command of the host system to the second physical erasing unit and marking the second physical erasing unit as belonging to a second group, wherein the second data belongs to a second type which is different from the first type; selecting a third physical erasing unit from the physical erasing units as an active physical erasing unit and marking the third physical erasing unit as belonging to the first group; and when a data moving operation is performed on the first physical erasing unit, moving valid data of the first physical erasing unit to the third physical erasing unit among the physical erasing units according to a first parameter of the first physical erasing unit.

According to an exemplary embodiment, a memory storage device is provided, the memory storage device includes a connection interface unit, a rewritable non-volatile memory module and a memory control circuit unit. The connection interface unit is configured to couple to a host system. The rewritable non-volatile memory module includes a plurality of physical erasing units. The memory controlling circuit unit is coupled to the connection interface unit and the rewritable non-volatile memory module. The memory control circuit unit is configured to retrieve at least one physical erasing unit from the physical erasing units as a first physical erasing unit for storing first data corresponding to a write command of a host system to the first physical erasing unit and marking the first physical erasing unit as belonging to a first group. The first data belongs to a first type. The memory control circuit unit is further configured to retrieve at least one physical erasing unit from the physical erasing units as a second physical erasing unit for storing second data corresponding to another write command of the host system to the second physical erasing unit and marking the second physical erasing unit as belonging to a second group. The second data belongs to a second type which is different from the first type. Further, the memory control circuit unit is further configured to select a third physical erasing unit from the physical erasing units as an active physical erasing unit and marking the third physical erasing unit as belonging to the first group. When a data moving operation is performed on the first physical erasing unit, the memory control circuit unit is further configured to move valid data of the first physical erasing unit to the third physical erasing unit among the physical erasing units according to a first parameter of the first physical erasing unit.

According to an exemplary embodiment, a memory control circuit unit for controlling a rewritable non-volatile memory module having a plurality of physical erasing units is provided. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to retrieve at least one physical erasing unit from the physical erasing units as a first physical erasing unit for storing first data corresponding to a write command of a host system to the first physical erasing unit and marking the first physical erasing unit as belonging to a first group. The first data belongs to a first type. The memory management circuit is further configured to retrieve at least one physical erasing unit from the physical erasing units as a second physical erasing unit for storing second data corresponding to another write command of the host system to the second physical erasing unit and marking the second physical erasing unit as belonging to a second group. The second data belongs to a second type which is different from the first type. Further, the memory management circuit is further configured to select a third physical erasing unit from the physical erasing units as an active physical erasing unit and marking the third physical erasing unit as belonging to the first group. When a data moving operation is performed on the first physical erasing unit, the memory management circuit is further configured to move valid data of the first physical erasing unit to the third physical erasing unit among the physical erasing units according to a first parameter of the first physical erasing unit.

Based on the above, the present invention provides a memory management method, a memory storage device and a memory control circuit unit, which can write cold data into the physical erasing unit belonging to a cold pool and write hot data into the physical erasing units belonging to a hot pool according to a data length, a valid data count and an erase count during a data moving operation, so as to facilitate the subsequent data moving operation and effectively improve the efficiency of data moving operation.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
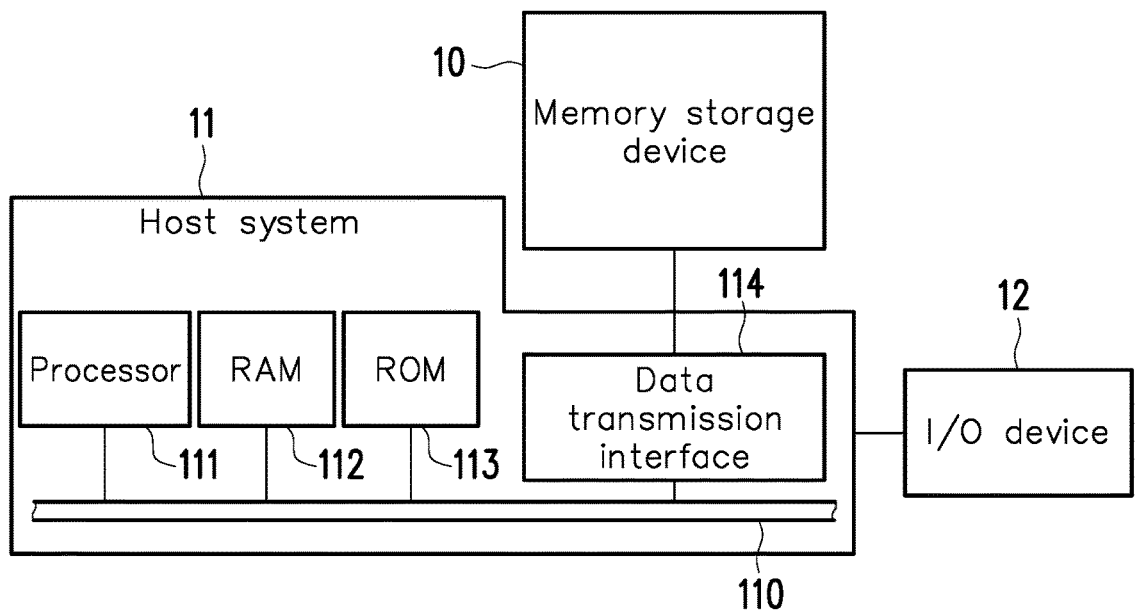
FIG. 1 is a schematic diagram illustrating a host system, a memory storage device and an I/O (input/output) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
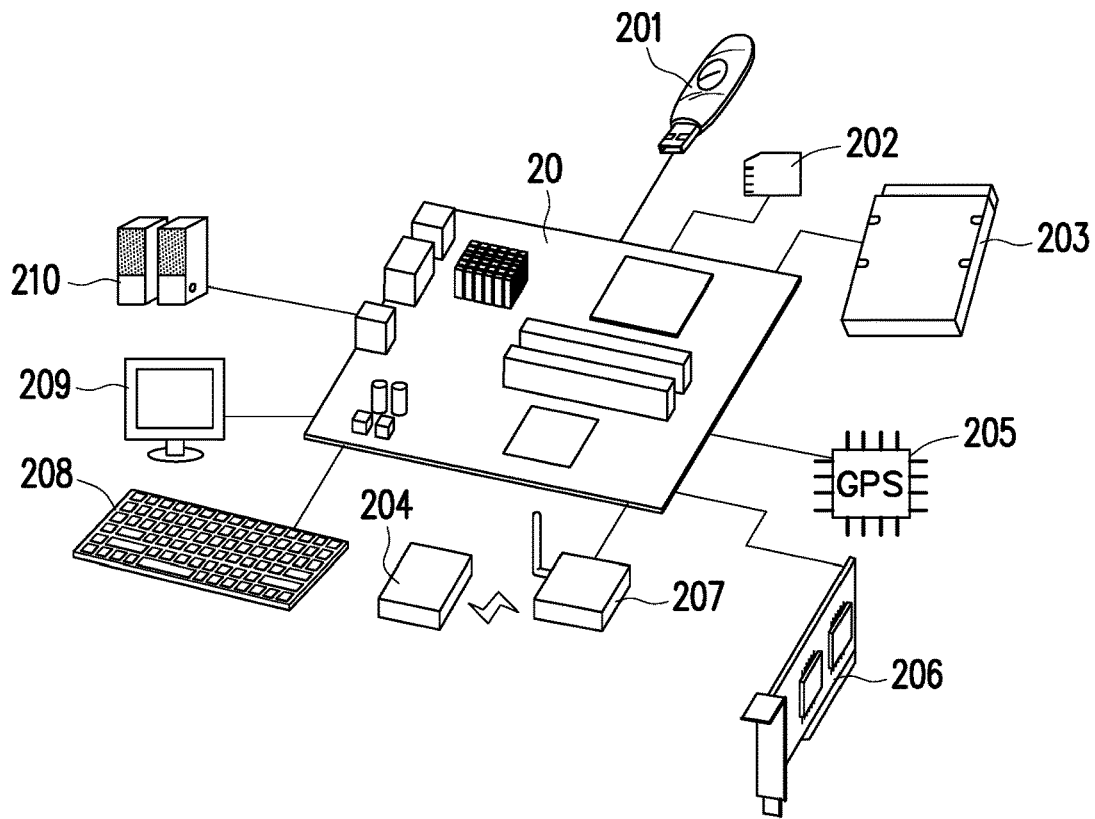
FIG. 2 is a schematic diagram illustrating a host system, a memory storage device and an I/O device according to another exemplary embodiment.

FIG. 1 is a schematic diagram illustrating a host system, a memory storage device and an I/O (input/output) device according to an exemplary embodiment. FIG. 2 is a schematic diagram illustrating a host system, a memory storage device and an I/O device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Via the data transmission interface 114, the main board 20 may be coupled to the memory storage device 510 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
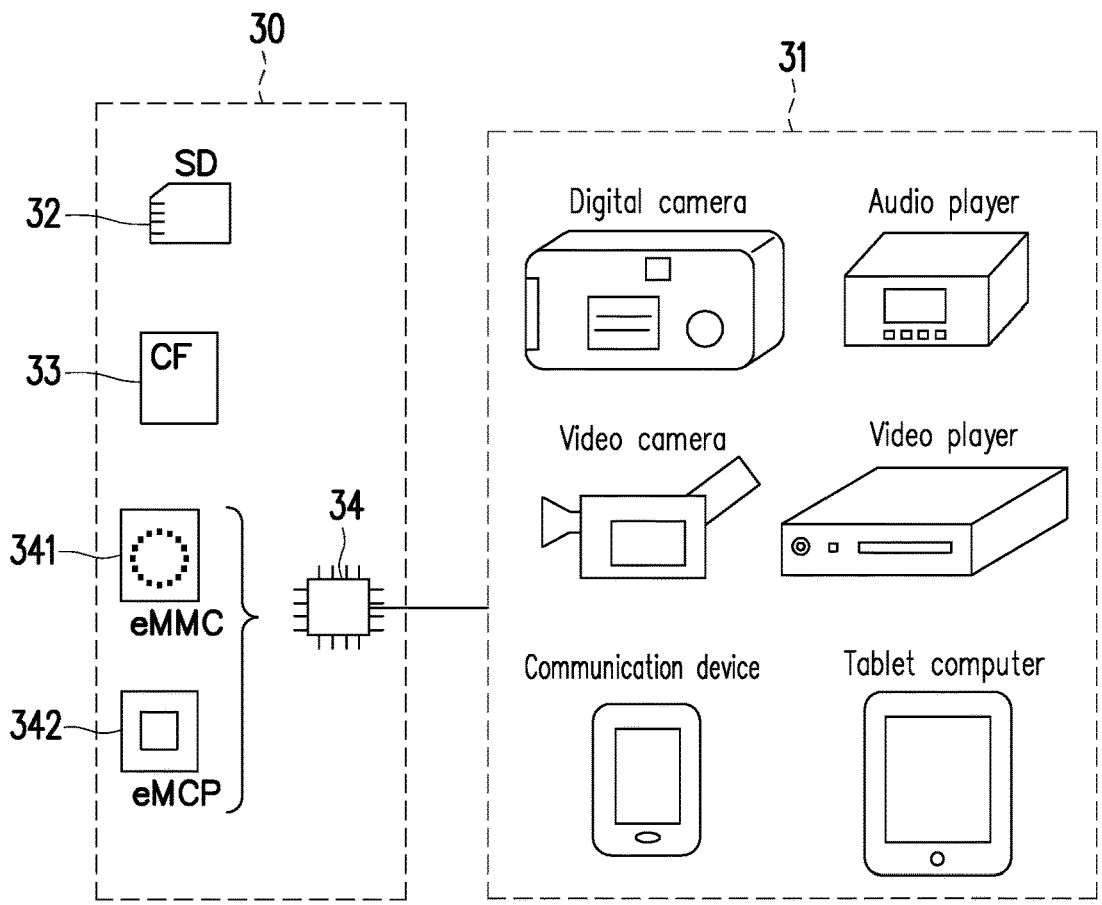
FIG. 3 is a schematic diagram illustrating a host system and a memory storage device according to another exemplary embodiment.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
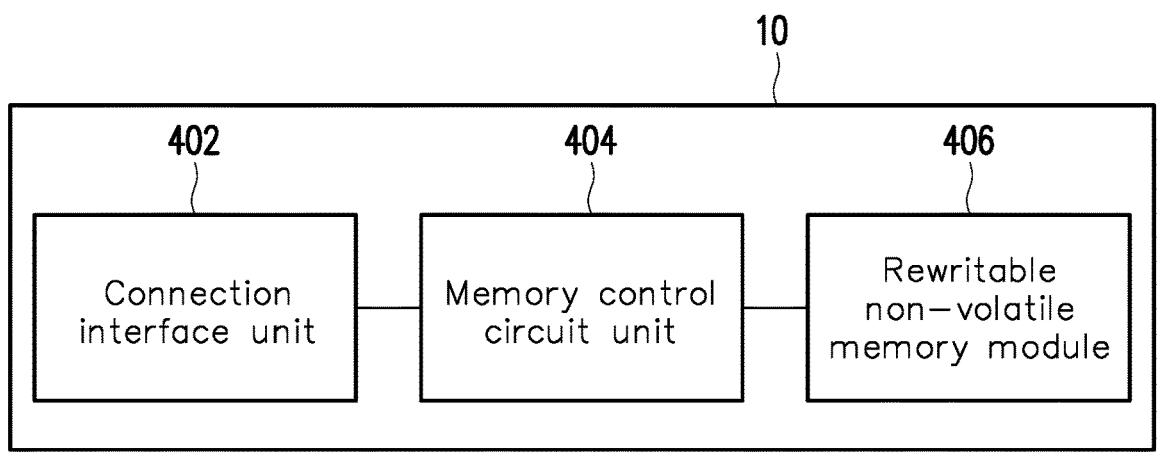
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. In the present exemplary embodiment, the connection interface unit 402 is compatible with a SATA (Serial Advanced Technology Attachment) standard. Nevertheless, it should be understood that the invention is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For example, a LSB (Least Significant Bit) of one memory cell belongs to the lower physical programming unit, and a MSB (most significant bit) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. If the physical programming unit is the physical page, these physical programming units usually include a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
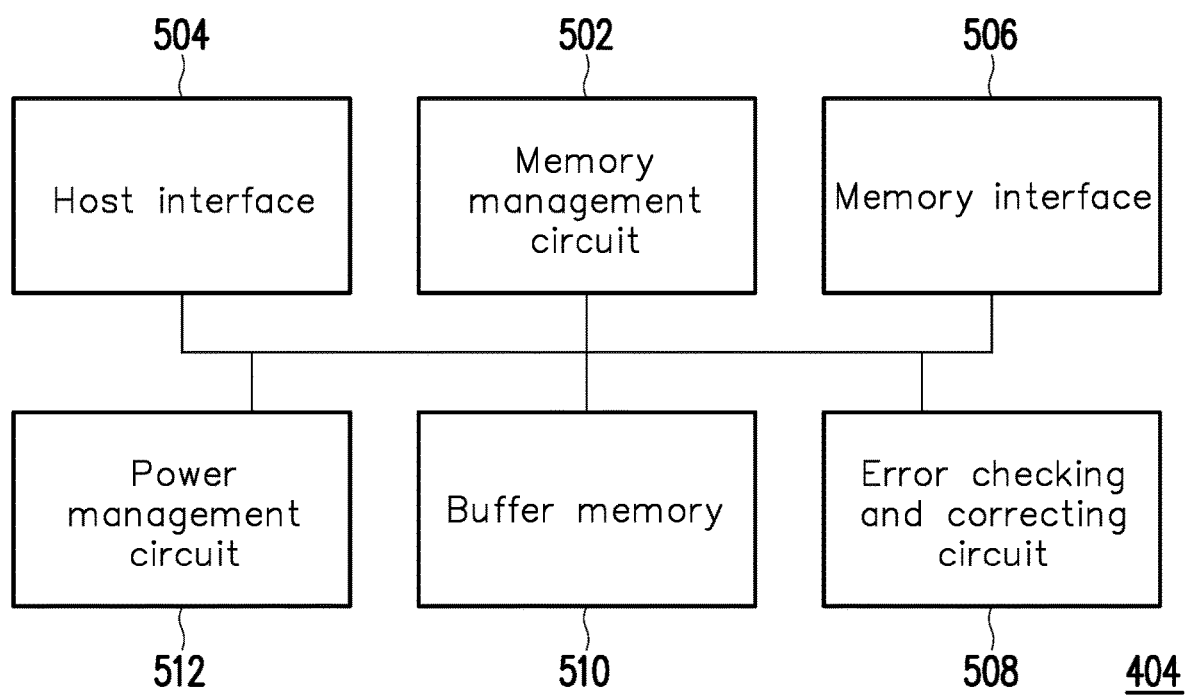
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (e.g., the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to issue a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In this exemplary embodiment, the host interface 504 is compatible with the SATA standard. Nevertheless, it should be understood that the invention is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data and the ECC and/or the EDC corresponding to the write command into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
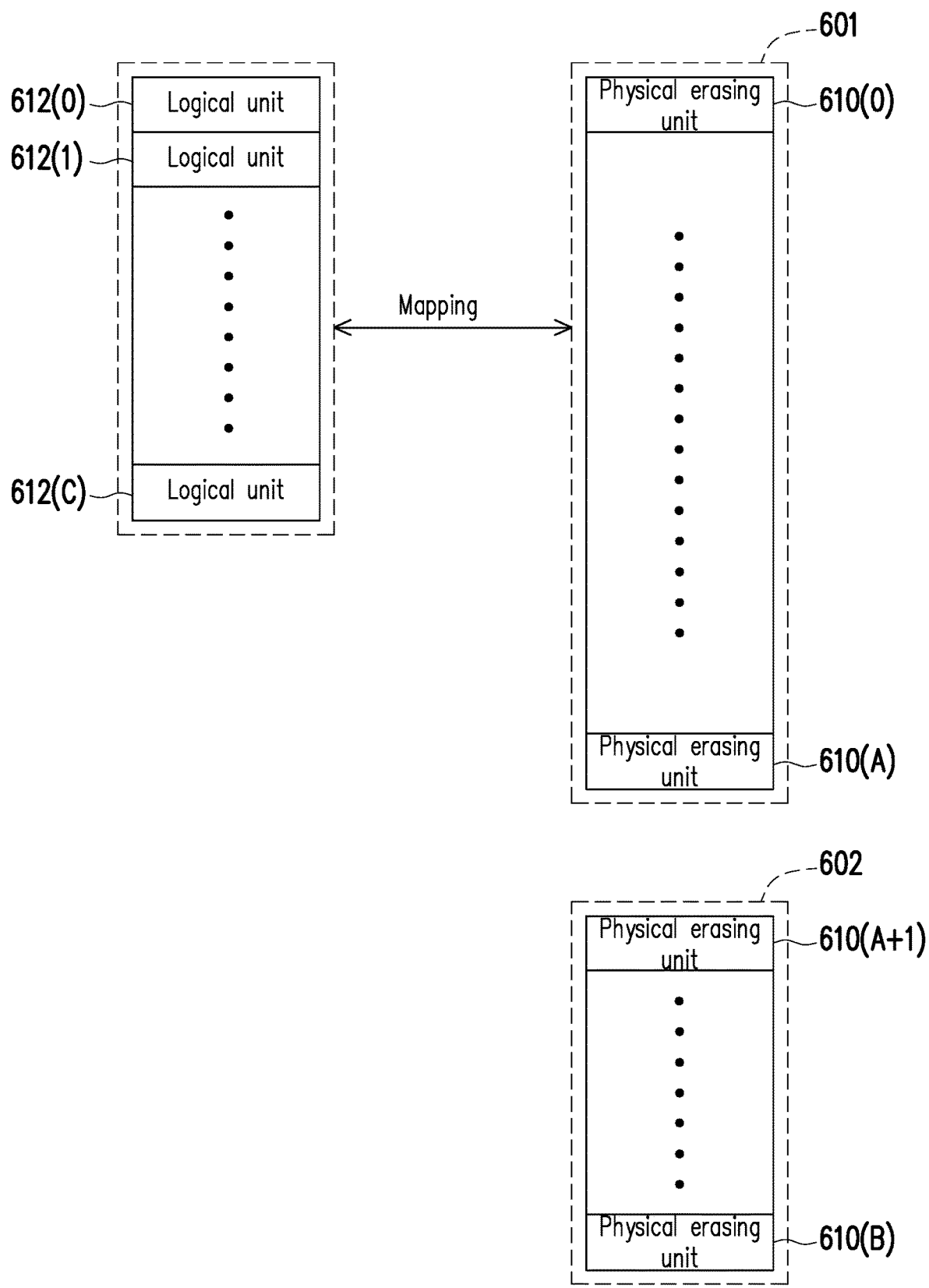
FIG. 6 is a schematic diagram illustrating management of a rewritable non-volatile memory module according to an exemplary embodiment.

FIG. 6 is a schematic diagram illustrating management of a rewritable non-volatile memory module according to an exemplary embodiment.

It is noted that terms such as "select" and "group" used for operating the physical erasing units are logical concepts which describe the management for the physical erasing units of the rewritable non-volatile memory module 406 in the following exemplary embodiments. That is, the physical erasing units of the rewritable non-volatile memory module 406 are logically operated, but actual positions of the physical erasing units of the rewritable non-volatile memory module 406 are not changed.

Referring to FIG. 6, the memory management circuit 502 groups physical erasing units 610(0) to 610(B) of the rewritable non-volatile memory module 406 into a storage area 601 and a spare area 602. For example, the physical erasing units 610(0) to 610(A) belong to the storage area 601, and the physical erasing units 610(A+1) to 610(B) belong to the spare area 602. In the present exemplary embodiment, one physical erasing unit refers to one physical block. However, in another exemplary embodiment, one physical erasing unit may also include a plurality of physical blocks. In addition, the memory management circuit 502 can associate one specific physical erasing unit with one of the storage area 601 and the spare area 602 by a marking method, etc.

During operation of the memory storage device 10, an association relation between one specific physical erasing unit and the storage area 601 or the spare area 602 may be dynamically changed. For example, when receiving write data from the host system 11, the memory management circuit 502 selects one physical erasing unit from the spare area 602 for storing at least a part of the write data and associates the physical erasing unit with the storage area 601. In addition, after one specific physical erasing unit belonging to the storage area 601 is erased to delete data therein, the memory management circuit 502 associates the specific physical erasing unit being erased with the spare area 602.

In the present exemplary embodiment, the physical erasing unit belonging to the spare area 602 is also known as a spare physical erasing unit, and the physical erasing unit belonging to the storage area 601 is also known as a non-spare physical erasing unit. Each physical erasing unit belonging to the spare area 602 is the physical erasing unit erased and not stored with any data, and each physical erasing unit belonging to the storage area 601 is stored with data. Furthermore, each physical erasing unit belonging to the spare area 602 is not stored with any valid data, and each physical erasing unit belonging to the storage area 601 may be stored with valid data and/or invalid data.

In an exemplary embodiment, the memory management circuit 502 assigns logical units 612(0) to 612(C) for mapping to the physical erasing units in the storage area 601. In the present exemplary embodiment, the host system 11 accesses the physical erasing unit of the storage area 601 through a logical address (LA). Therefore, each logical unit in the logical units 612(0) to 612(C) refers to one logical address. However, in another exemplary embodiment, each logical unit among the logical units 612(0) to 612(C) may also refer to one logical programming unit, one logical erasing unit or a composition of a plurality of consecutive or non-consecutive logical addresses. In addition, each logical unit in the logical units 612(0) to 612(C) may also be mapped to one or more physical erasing units.

In the present exemplary embodiment, the memory management circuit 502 records a mapping relation (also known as a logical-physical mapping relation) between the logical units and the physical erasing units into at least one logical-physical mapping table. When the host system 11 intends to read the data from the memory storage device 10 or write the data into the memory storage device 10, the memory management circuit 502 may access the data in the memory storage device 10 according to the logical-to-physical mapping table.

In the present exemplary embodiment, the valid data is the latest data belonging to one specific logical unit, and the invalid data is the latest data not belonging to any logical unit. For example, if the host system 11 stores new data into one specific logical unit to overwrite old data originally stored in that specific logical unit (i.e., update the data of that specific logical unit), this new data stored in the storage area 601 is the latest data belonging to that specific logical unit and marked as valid, whereas the old data being overwritten may still be stored in the storage area 601 but marked as invalid. In the present exemplary embodiment, if data belonging to one logical unit is updated, a mapping relation between that logical unit and the physical erasing unit stored with the old data belonging to that logical unit will be removed, and a mapping relation between that logical unit and the physical erasing unit stored with the latest data belonging to that logical unit will be established.

Figure 7:
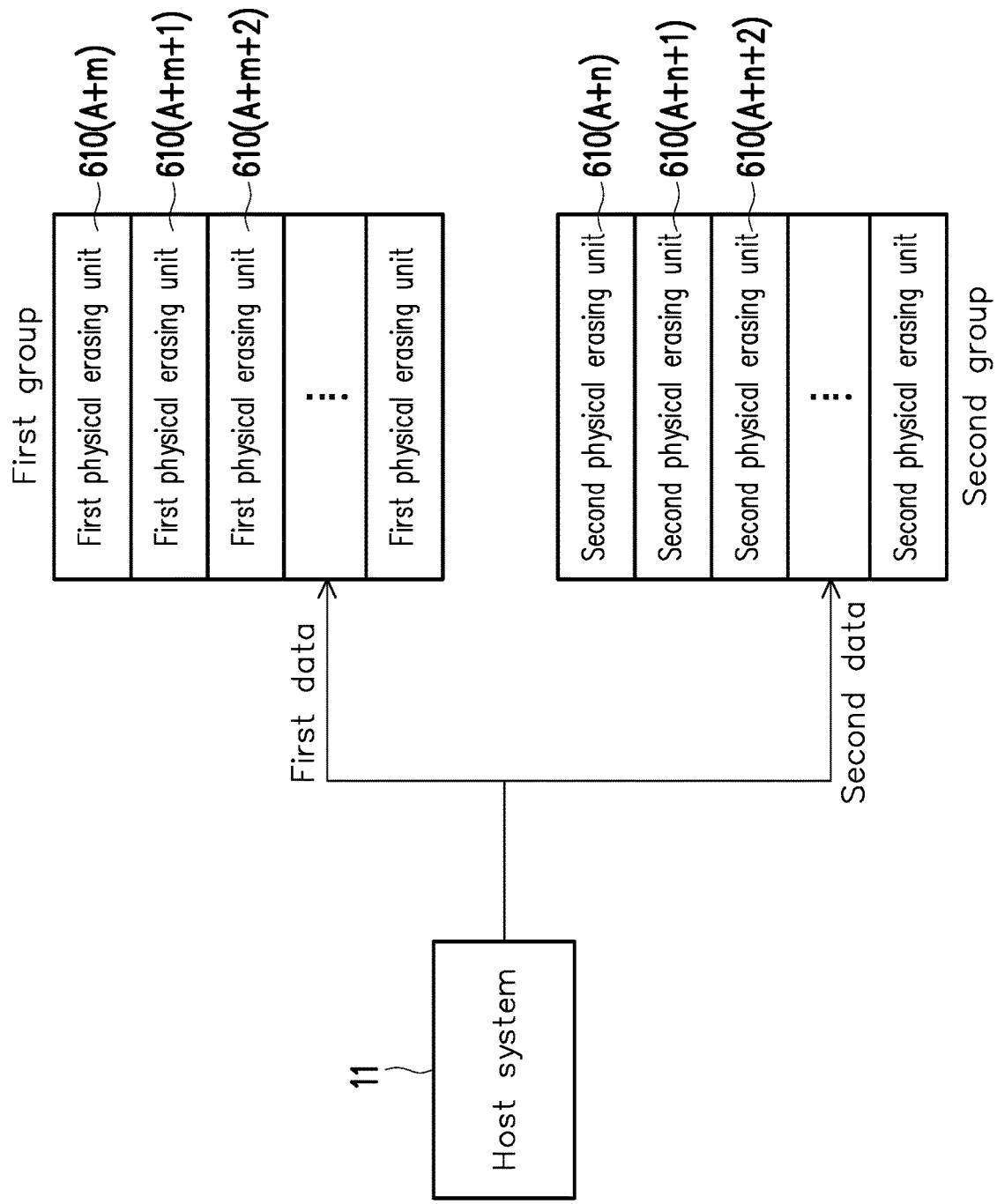
FIG. 7 is a schematic diagram illustrating how data are written into physical erasing units belonging to a first group and physical erasing units belonging to a second group according to an exemplary embodiment.

FIG. 7 is a schematic diagram illustrating how data are written into physical erasing units belonging to a first group and physical erasing units belonging to a second group according to an exemplary embodiment.

With reference to FIG. 7, in the present exemplary embodiment, the memory management circuit 502 selects at least one physical erasing unit from the spare area 602 as an active physical erasing unit for storing cold data from the host system 11, and the cold data from the host system 11 will be received and stored in that physical erasing unit before that physical erasing unit is fully written. After that physical erasing unit is fully written, the memory management circuit 502 selects another physical erasing unit from the spare area 602 as a new active physical erasing unit for storing the cold data.

In addition, the memory management circuit 502 selects at least one physical erasing unit from the spare area 602 as another active physical erasing unit for storing hot data from the host system 11, and the hot data from the host system 11 will be received and stored in that physical erasing unit before that physical erasing unit is fully written. After that physical erasing unit is fully written, the memory management circuit 502 selects another physical erasing unit from the spare area 602 as a new active physical erasing unit for storing the hot data.

In this exemplary embodiment, the memory management circuit 502 marks the physical erasing units storing the cold data as belonging to a first group, namely, a cold pool; and marks the physical erasing units storing the hot data as belonging to a second group, namely, a cold pool. In an exemplary embodiment, the records of the markings may be stored in the redundancy bit area for indicating that the physical erasing unit belongs to the first group or the second group. However, in another exemplary embodiment, the memory management circuit 502 only records a corresponding relationship between the physical erasing units and the groups in a physical erasing unit-group corresponding table.

In this exemplary embodiment, the memory management circuit 502 determines whether a data length of the data is greater than a length preset value after receiving the data from the host system 11. When the data length of the data is greater than the length preset value, the memory management circuit 502 will regard the data as the cold data and store the data in the active physical erasing unit for storing the cold data. Conversely, when the data length of the data is not greater than the length preset value, the memory management circuit 502 will regard the data as the hot data and store the data in the active physical erasing unit for storing the hot data.

For example, in this exemplary embodiment, the memory management circuit 502 selects a first physical erasing unit as the active physical erasing unit for storing the cold data, and selects a second physical erasing unit as the active physical erasing unit for storing the hot data. Here, the first physical erasing unit will be marked as belonging to the first group and the second physical erasing unit will be marked as belonging to the second group. After that, for example, when receiving first data with the data length greater than the length preset value, the memory management circuit 502 will write the first data into the first physical erasing unit. When receiving second data with the data length not greater than the length preset value, the memory management circuit 502 will write the second data into the second physical erasing unit. Later, after the first physical erasing unit or the second physical erasing unit is fully written, the memory management circuit 502 associates the first physical erasing unit or the second physical erasing unit being fully written with the storage area 601, and selects the physical erasing unit from the spare area 602 as the new active physical erasing unit again.

In this exemplary embodiment, the memory management circuit 502 detects a total of the current spare physical erasing units (i.e., the physical erasing units belonging to the spare area 602) and determines whether such total is less than a first threshold. For example, the first threshold may be 2. If the total of the current spare physical unit is less than the first threshold, the memory management circuit 502 activates a data moving operation (e.g., which may be a garbage collecting operation or a wear leveling operation). In the present exemplary embodiment, the operation of detecting the total of the spare physical erasing units and determining whether the total is less than the first threshold is performed in response to one specific physical erasing unit being selected as the active physical erasing unit. Moreover, in another exemplary embodiment, the operation of detecting the total of the spare physical erasing unit and determining whether the total amount is less than the first threshold is continuously performed at the background instead.

In the data moving operation, the memory management circuit 502 selects at least one physical unit from the spare area 602 as a recycling node for the valid data and selects at least one physical unit from the storage area 601 as a source node for the valid data. The memory management circuit 502 collects the valid data from the physical erasing unit being the source node and stores the collected valid data in the physical erasing unit being the recycling node. After all the valid data stored by one specific physical erasing unit are collected, that specific physical erasing unit is erased and re-associated with the spare area 602. Accordingly, through the data moving operation, the memory management circuit 502 can release the new spare physical erasing unit.

Figure 8:
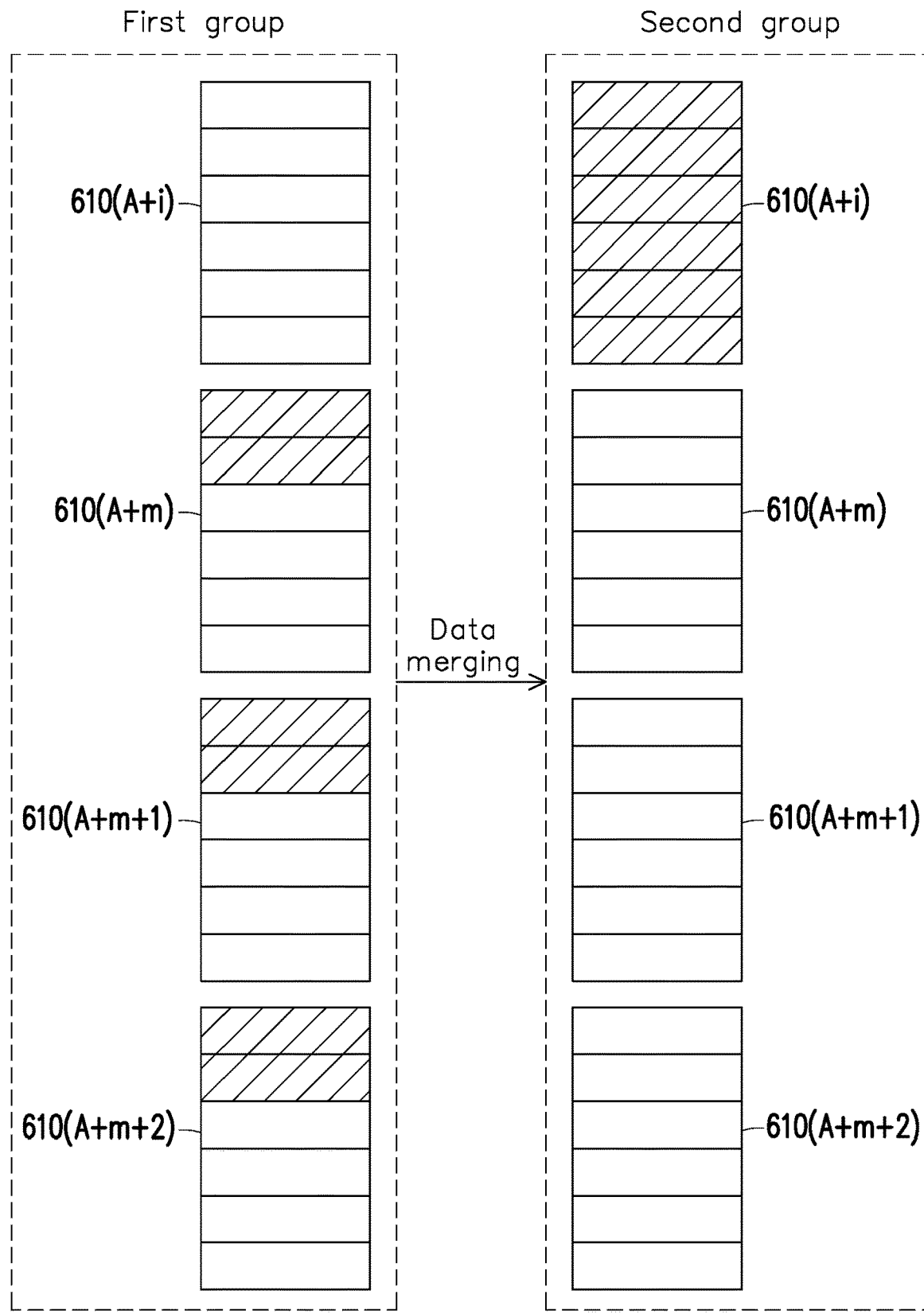
FIG. 8 is a schematic diagram illustrating a data moving operation performed on valid data in the physical erasing units of the first group according to an exemplary embodiment.

FIG. 8 is a schematic diagram illustrating a data moving operation performed on valid data in the physical erasing units of the first group according to an exemplary embodiment.

With reference to FIG. 8, in an exemplary embodiment, when performing the data moving operation on the first physical erasing unit, the memory management circuit 502 selects a physical erasing unit 610(A+m), a physical erasing unit 610(A+m+1) and a physical erasing unit 610(A+m+2) with a valid data count not less than a first preset value from the first group as the source node for the valid data, and uses a third physical erasing unit 610(A+i) marked as the first group as the recycling node for the valid data. The memory management circuit 502 collects the valid data from the physical erasing unit 610(A+m), the physical erasing unit 610(A+m+1) and the physical erasing unit 610(A+m+2) being to the source node, and moves the collected valid data to the physical erasing unit 610(A+i) being the recycling node. After all the valid data stored by the physical erasing unit 610(A+m), the physical erasing unit 610(A+m+1) and the physical erasing unit 610(A+m+2) are collected, the physical erasing unit 610(A+m), the physical erasing unit 610(A+m+1) and the physical erasing unit 610(A+m+2) will be erased and re-associated with the spare area 602. In this way, through the data moving operation, the memory management circuit 502 can perform a valid data merging and moving on the physical erasing unit 610(A+m), the physical erasing unit 610(A+m+1) and the physical erasing unit 610(A+m+2) with the valid data count not less than the first preset value in the first group, so as to release the new spare physical erasing units (i.e., the physical erasing unit 610(A+m), the physical erasing unit 610(A+m+1) and the physical erasing unit 610(A+m+2)). It should be noted that, slashed shadow portions in the physical erasing unit 610(A+m), the physical erasing unit 610(A+m+2), the physical erasing unit 610(A+m+2) and the physical erasing unit 610(A+i) in FIG. 8 refer to the stored valid data.

In an exemplary embodiment, in the example of storing the data with the data length greater than the length preset value in the physical erasing unit in the first group, said data may also be the hot data. That is to say, said data should be written into the physical erasing unit belonging to the second group.

Figure 9:
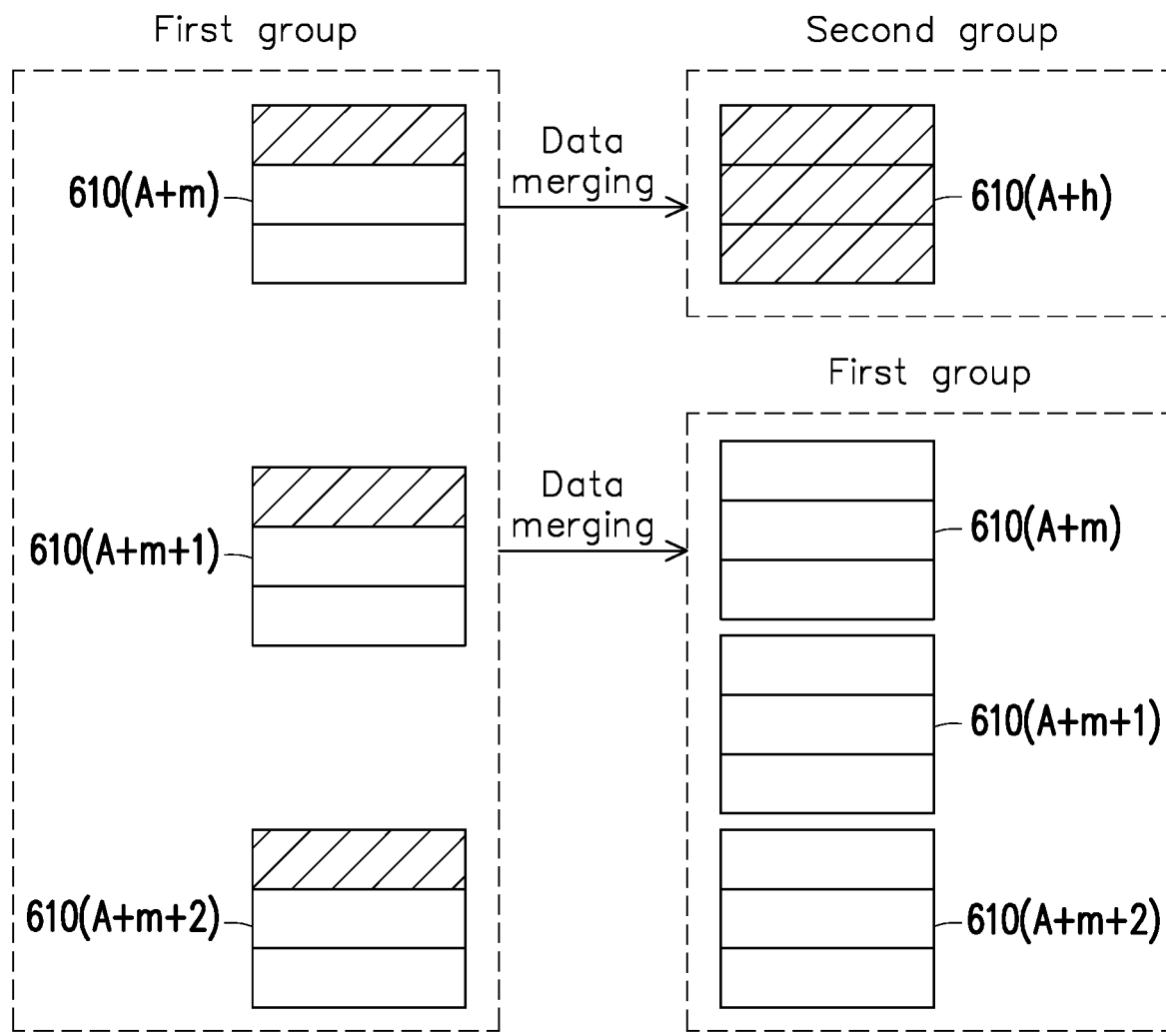
FIG. 9 is a schematic diagram illustrating the data moving operation performed on the valid data in the physical erasing units mistakenly determined as belonging to the first group according to an exemplary embodiment.

FIG. 9 is a schematic diagram illustrating the data moving operation performed on the valid data in the physical erasing units mistakenly determined as belonging to the first group according to an exemplary embodiment.

With reference to FIG. 9, in an exemplary embodiment, when performing the data moving operation on the first physical erasing unit, the memory management circuit 502 selects the physical erasing unit 610(A+m), the physical erasing unit 610(A+m+1) and the physical erasing unit 610(A+m+2) with the valid data count less than the first preset value from the first group as the source node for the valid data, and uses a physical erasing unit 610(A+h) marked as the second group as the recycling node for the valid data. The memory management circuit 502 collects the valid data from the physical erasing unit 610(A+m), the physical erasing unit 610(A+m+1) and the physical erasing unit 610(A+m+2) being to the source node, and moves the collected valid data to the physical erasing unit 610(A+h) being the recycling node. After all the valid data stored by the physical erasing unit 610(A+m), the physical erasing unit 610(A+m+1) and the physical erasing unit 610(A+m+2) are collected, the physical erasing unit 610(A+m), the physical erasing unit 610(A+m+1) and the physical erasing unit 610(A+m+2) will be erased and re-associated with the spare area 602. In this way, through the data moving operation, the memory management circuit 502 can perform the valid data merging and moving on the physical erasing unit 610(A+m), the physical erasing unit 610(A+m+1) and the physical erasing unit 610(A+m+2) with the valid data count less than the first preset value in the first group, so as to release the new spare physical erasing units (i.e., the physical erasing unit 610(A+m), the physical erasing unit 610(A+m+1) and the physical erasing unit 610(A+m+2)). It should be noted that, slashed shadow portions in the physical erasing unit 610(A+m), the physical erasing unit 610(A+m+2), the physical erasing unit 610(A+m+2) and the physical erasing unit 610(A+h) in FIG. 9 refer to the stored valid data.

In the foregoing exemplary embodiments, the first preset value may be set to 10% of the capacity of one physical erasing unit. That is to say, when the valid data count of the first physical erasing unit is not less than 10% of the capacity of one physical erasing unit, the memory management circuit 502 collects the valid data from the first physical erasing unit being the source node with the valid data count not less than 10% of the capacity of one physical erasing unit, and moves the collected data to the third physical erasing unit being the recycling node. When the valid data count of the first physical erasing unit is less than 10% of the capacity of one physical erasing unit, the memory management circuit 502 collects the valid data from the first physical erasing unit being the source node with the valid data count less than 10% of the capacity of one physical erasing unit, and moves the collected data to the physical erasing unit being the recycling node.

Figure 10:
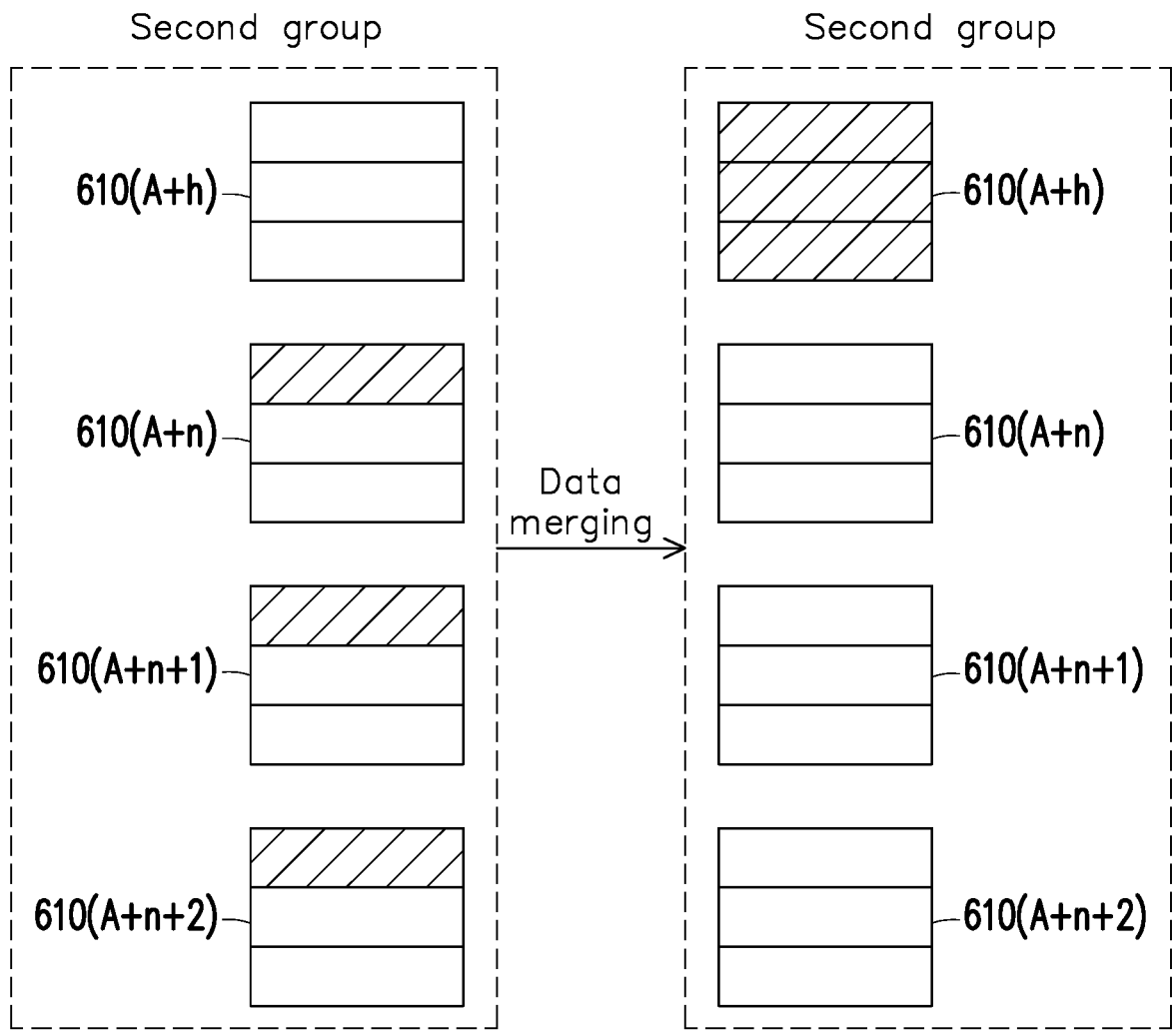
FIG. 10 is a schematic diagram illustrating the data moving operation performed on the valid data in the physical erasing units of the second group according to an exemplary embodiment.

FIG. 10 is a schematic diagram illustrating the data moving operation performed on the valid data in the physical erasing units of the second group according to an exemplary embodiment of the invention.

With reference to FIG. 10, in an exemplary embodiment, when performing the data moving operation on the second physical erasing unit, the memory management circuit 502 selects a physical erasing unit 610(A+n), a physical erasing unit 610(A+n+1) and a physical erasing unit 610(A+n+2) with the valid data count less than a second preset value from the second group as the source node for the valid data, and uses the physical erasing unit 610(A+h) marked as the second group as the recycling node for the valid data. The memory management circuit 502 collects the valid data from the physical erasing unit 610(A+n), the physical erasing unit 610(A+n+1) and the physical erasing unit 610(A+n+2) being to the source node, and moves the collected valid data to the physical erasing unit 610(A+h) being the recycling node. After all the valid data stored by the physical erasing unit 610(A+n), the physical erasing unit 610(A+n+1) and the physical erasing unit 610(A+n+2) are collected, the physical erasing unit 610(A+n), the physical erasing unit 610(A+n+1) and the physical erasing unit 610(A+n+2) will be erased and re-associated with the spare area 602. In this way, through the data moving operation, the memory management circuit 502 can perform the valid data merging and moving on the physical erasing unit 610(A+n), the physical erasing unit 610(A+n+1) and the physical erasing unit 610(A+n+2) with the valid data count less than the second preset value in the second group, so as to release the new spare physical erasing units (i.e., the physical erasing unit 610(A+n), the physical erasing unit 610(A+n+1) and the physical erasing unit 610(A+n+2)). It should be noted that, slashed shadow portions in the physical erasing unit 610(A+n), the physical erasing unit 610(A+n+2), the physical erasing unit 610(A+n+2) and the physical erasing unit 610(A+h) in FIG. 10 refer to the stored valid data.

In an exemplary embodiment, in the example of storing the data with the data length not greater than the length preset value in the physical erasing unit in the second group, said data may also be the cold data. That is to say, said data should be written into the physical erasing unit belonging to the first group.

Figure 11:
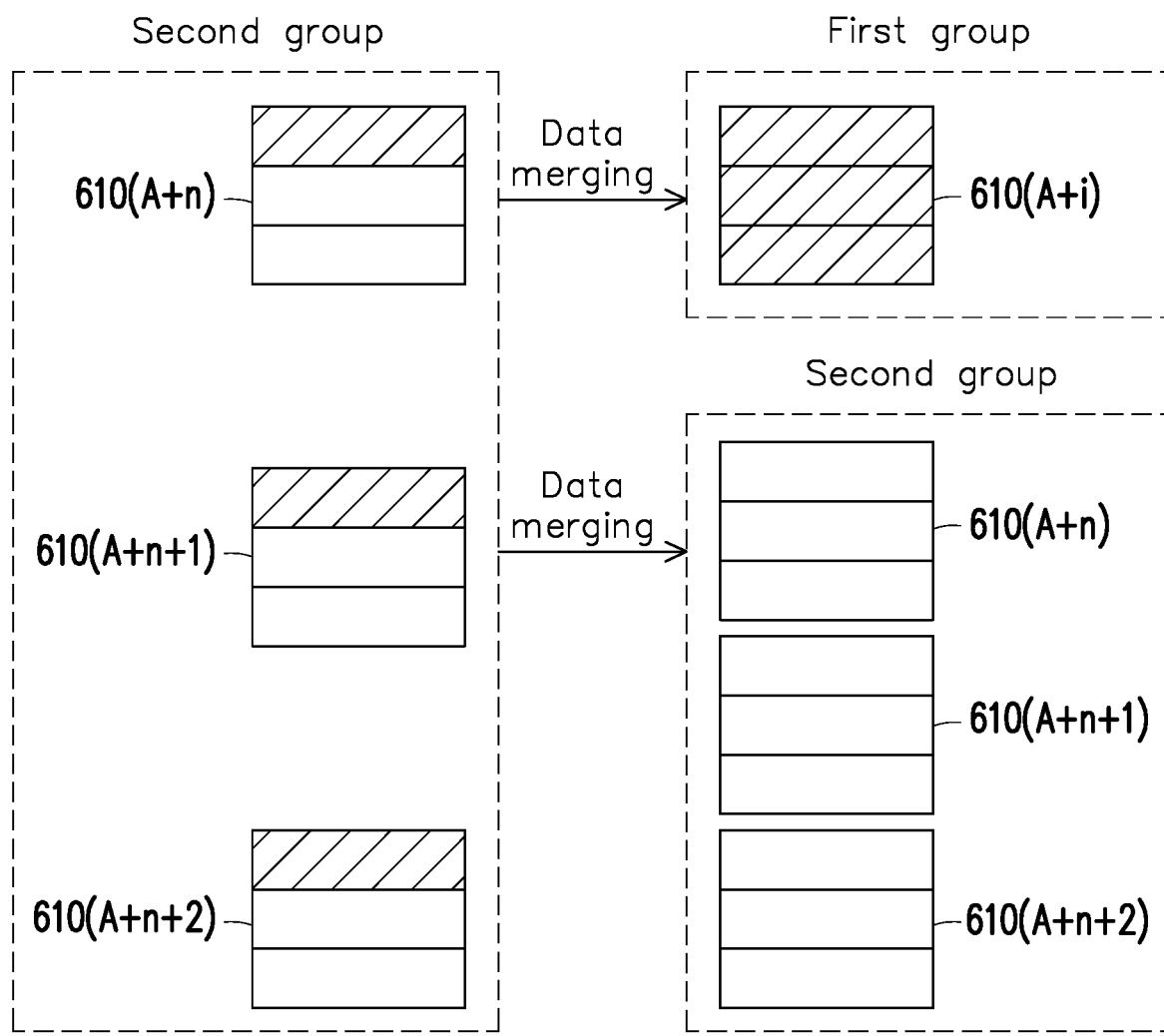
FIG. 11 is a schematic diagram illustrating the data moving operation performed on the valid data in the physical erasing units mistakenly determined as belonging to the second group according to an exemplary embodiment.

FIG. 11 is a schematic diagram illustrating the data moving operation performed on the valid data in the physical erasing units mistakenly determined as belonging to the second group according to an exemplary embodiment.

With reference to FIG. 11, in an exemplary embodiment, when performing the data moving operation on the second physical erasing unit, the memory management circuit 502 selects the physical erasing unit 610(A+n), the physical erasing unit 610(A+n+1) and the physical erasing unit 610(A+n+2) with the valid data count not less than the second preset value from the second group as the source node for the valid data, and uses the physical erasing unit 610(A+i) marked as the first group as the recycling node for the valid data. The memory management circuit 502 collects the valid data from the physical erasing unit 610(A+n), the physical erasing unit 610(A+n+1) and the physical erasing unit 610(A+n+2) being to the source node, and moves the collected valid data to the physical erasing unit 610(A+i) being the recycling node. After all the valid data stored by the physical erasing unit 610(A+n), the physical erasing unit 610(A+n+1) and the physical erasing unit 610(A+n+2) are collected, the physical erasing unit 610(A+n), the physical erasing unit 610(A+n+1) and the physical erasing unit 610(A+n+2) will be erased and re-associated with the spare area 602. In this way, through the data moving operation, the memory management circuit 502 can perform the valid data merging and moving on the physical erasing unit 610(A+n), the physical erasing unit 610(A+n+1) and the physical erasing unit 610(A+n+2) with the valid data count not less than the second preset value in the second group, so as to release the physical erasing units (i.e., the physical erasing unit 610(A+n), the physical erasing unit 610(A+n+1) and the physical erasing unit 610(A+n+2)) to the spare area 602. It should be noted that, slashed shadow portions in the physical erasing unit 610(A+n), the physical erasing unit 610(A+n+2), the physical erasing unit 610(A+n+2) and the physical erasing unit 610(A+i) in FIG. 11 refer to the stored valid data.

In the foregoing exemplary embodiments, the second preset value may be set to 3% of the capacity of one physical erasing unit. That is to say, when the valid data count of the second physical erasing unit is less than 3% of the capacity of one physical erasing unit, the memory management circuit 502 collects the valid data from the second physical erasing unit being the source node with the valid data count less than 3% of the capacity of one physical erasing unit, and moves the collected data to the fourth physical erasing unit being the recycling node. When the valid data count of the second physical erasing unit is not less than 3% of the capacity of one physical erasing unit, the memory management circuit 502 collects the valid data from the second physical erasing unit being the source node with the valid data count not less than 3% of the capacity of one physical erasing unit, and moves the collected data to the third physical erasing unit being the recycling node.

It should be noted that, in the foregoing exemplary embodiments, a data type of the first data and the second data (e.g., a first type or a second type,) is determined according to whether the data length is greater than the length preset value. When the garbage collecting operation is performed on the physical erasing unit, whether to move the valid data of the physical erasing unit to the physical erasing unit belonging to the first group or to move the physical erasing unit to the physical erasing unit belonging to the second group is determined according to the relationship between the valid data count, the first preset value and the second preset value. In another exemplary embodiment, when the wear leveling operation is performed on the physical erasing unit, whether to move the valid data of the physical erasing unit to the physical erasing unit belonging to the first group or to move the physical erasing unit to the physical erasing unit belonging to the second group is further determined according to an erase count and an average erase count. In other exemplary embodiments, the data type of the first data and the second data may also be determined according to one of a hit rate, a data state (e.g., being the cold data or the hot data) and an operating system behavior (e.g., accessing the file system first at boot-up), and whether to move the valid data of the physical erasing unit to the physical erasing unit belonging to the first group or to move the physical erasing unit to the physical erasing unit belonging to the second group is determined according to one of the hit rate, the data state and the operating system behavior. In the foregoing exemplary embodiments, the data length, the hit rate, the data state and the operating system behavior or other data or system characteristics are also known as a second parameter, and the valid data count, the erase count, the hit rate, and the operating system behavior or other data or system characteristics are also known as a first parameter. The present invention is not limited in this regard.

Figure 12:
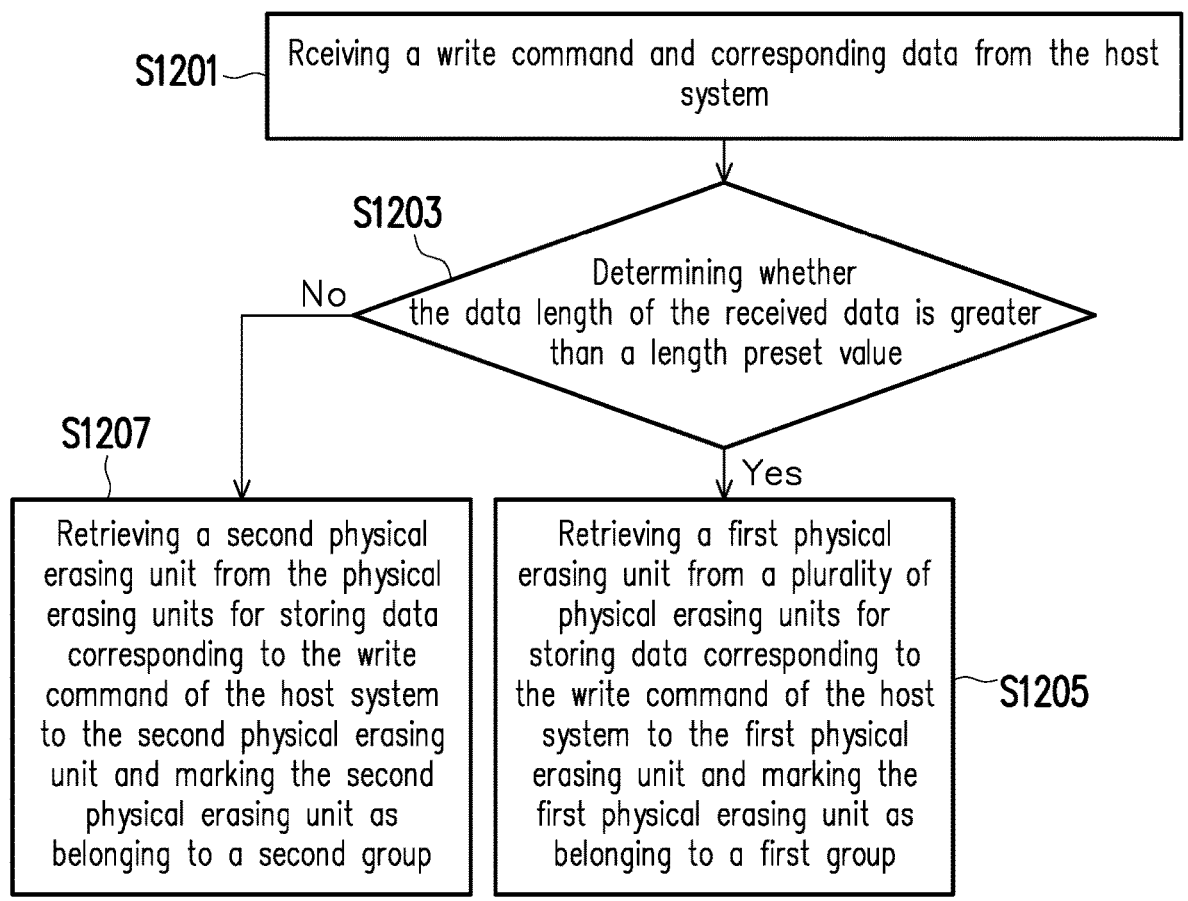
FIG. 12 is a flowchart illustrating a memory management method according to an exemplary embodiment.

FIG. 12 is a flowchart illustrating a memory management method according to an exemplary embodiment.

With reference to FIG. 12, in step S1201, the memory management circuit 502 receives a write command and corresponding data from the host system 11.

In step S1203, the memory management circuit 502 determines whether the data length of the received data is greater than a length preset value.

If the data length of the received data is greater than the length preset value, in step S1205, the memory management circuit 502 retrieves a first physical erasing unit from a plurality of physical erasing units of the rewritable non-volatile memory module 406 for storing data corresponding to the write command of the host system 11 (i.e., the first data described below) to the first physical erasing unit and marking the first physical erasing unit as belonging to a first group.

If the data length of the received data is not greater than the length preset value, in step S1207, the memory management circuit 502 retrieves a second physical erasing unit from the physical erasing units of the rewritable non-volatile memory module 406 for storing the data corresponding to the write command of the host system 11 (i.e., the second data described below) to the second physical erasing unit and marking the second physical erasing unit as belonging to a second group.

Figure 13:
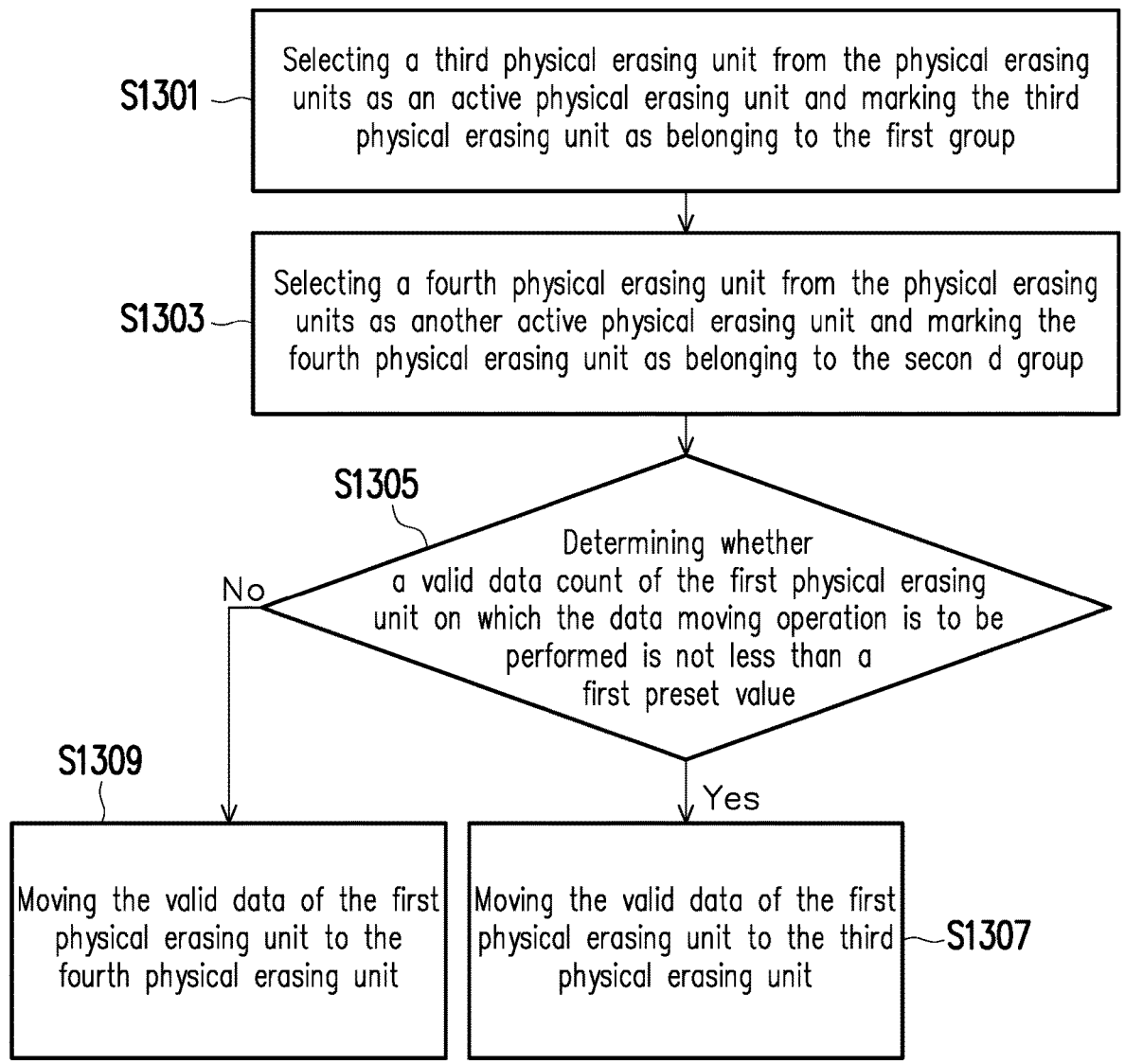
FIG. 13 is a flowchart illustrating the data moving operation performed on the physical erasing units marked as the first group according to another exemplary embodiment.

FIG. 13 is a flowchart illustrating the data moving operation performed on the physical erasing units marked as the first group according to another exemplary embodiment.

With reference to FIG. 13, in step S1301, the memory management circuit 502 selects a third physical erasing unit from the physical erasing units as an active physical erasing unit and marking the third physical erasing unit as belonging to the first group.

In step S1303, the memory management circuit 502 selects a fourth physical erasing unit from the physical erasing units as another active physical erasing unit and marking the fourth physical erasing unit as belonging to the second group.

In step S1305, the memory management circuit 502 determines whether a valid data count of the physical erasing unit on which the data moving operation is to be performed (hereinafter, referred to as the first physical erasing unit) is not less than a first preset value.

When the valid data count of the first physical erasing unit is not less than the first preset value, in step S1307, the memory management circuit 502 moves the valid data of the first physical erasing unit to the third physical erasing unit.

When the valid data count of the first physical erasing unit is less than the first preset value, in step S1309, the memory management circuit 502 moves the valid data of the first physical erasing unit to the fourth physical erasing unit.

Figure 14:
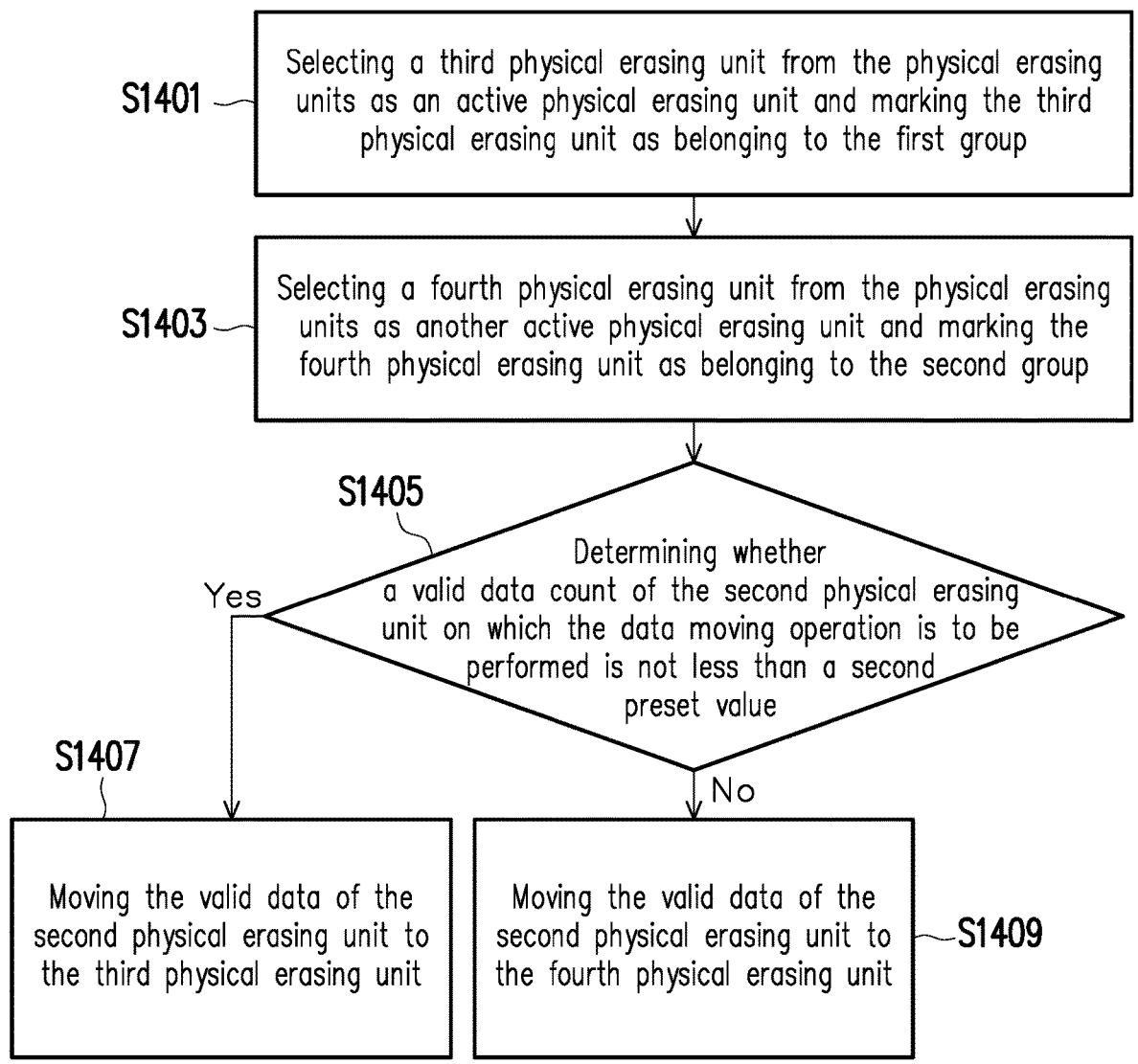
FIG. 14 is a flowchart illustrating the data moving operation performed on the physical erasing units marked as the second group according to another exemplary embodiment.

FIG. 14 is a flowchart illustrating the data moving operation performed on the physical erasing units marked as the second group according to another exemplary embodiment.

With reference to FIG. 14, in step S1401, the memory management circuit 502 selects a third physical erasing unit from the physical erasing units as an active physical erasing unit and marking the third physical erasing unit as belonging to the first group.

In step S1403, the memory management circuit 502 selects a fourth physical erasing unit from the physical erasing units as another active physical erasing unit and marking the fourth physical erasing unit as belonging to the second group.

In step S1405, the memory management circuit 502 determines whether a valid data count of the physical erasing unit on which the data moving operation is to be performed (hereinafter, referred to as the second physical erasing unit) is not less than a second preset value.

When the valid data count of the second physical erasing unit is not less than the second preset value, in step S1407, the memory management circuit 502 moves the valid data of the second physical erasing unit to the third physical erasing unit.

When the valid data count of the second physical erasing unit is less than the second preset value, in step S1409, the memory management circuit 502 moves the valid data of the second physical erasing unit to the fourth physical erasing unit.

In summary, the present invention provides a memory management method, a memory storage device and a memory control circuit unit, which are capable of assigning the data to the first group or the second group according to the data length, writing the first data with longer data length into the first physical erasing unit in the first group, writing the second data with shorter data length into the second physical erasing unit in the second group, associating the fully written first and second physical erasing units with the storage area, and performing the data moving operation respectively according to the valid data counts of the first and second physical erasing units, so as to effectively improve the efficiency of moving data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module comprising a plurality of physical erasing units, and the memory management method comprising:
    retrieving at least one physical erasing unit from the physical erasing units as a first physical erasing unit for storing first data corresponding to a write command of a host system to the first physical erasing unit and marking the first physical erasing unit as belonging to a first group, wherein the first data belongs to a first type;
    retrieving at least one physical erasing unit from the physical erasing units as a second physical erasing unit for storing second data corresponding to another write command of the host system to the second physical erasing unit and marking the second physical erasing unit as belonging to a second group, wherein the second data belongs to a second type different from the first type;
    selecting a third physical erasing unit from the physical erasing units as an active physical erasing unit and marking the third physical erasing unit as belonging to the first group;
    selecting a fourth physical erasing unit from the physical erasing units as another active physical erasing unit and marking the fourth physical erasing unit as belonging to the second group;
    when a garbage collecting operation is performed on the first physical erasing unit, valid data of the first physical erasing unit is moved to the third physical erasing unit among the physical erasing units if a valid data count of the first physical erasing unit is not less than a first preset value;
    when the garbage collecting operation is performed on the first physical erasing unit, moving the valid data of the first physical erasing unit to the fourth physical erasing unit if the valid data count of the first physical erasing unit is less than the first preset value;
    when the garbage collecting operation is performed on the second physical erasing unit, moving valid data of the second physical erasing unit to the fourth physical erasing unit if a valid data count of the second physical erasing unit is less than a second preset value; and
    when the garbage collecting operation is performed on the second physical erasing unit, moving the valid data of the second physical erasing unit to the third physical erasing unit if the valid data count of the second physical erasing unit is not less than the second preset value.

2. The memory management method of claim 1, further comprising:
    receiving the first data from the host system and determining the first data as belonging to the first type or the second type according to a second parameter; and
    receiving the second data from the host system and determining the second data as belonging to the first type or the second type according to the second parameter.

3. The memory management method of claim 2, wherein the second parameter is one of a data length, a hit rate, a data state and an operating system behavior.

4. The memory management method of claim 2, wherein the second parameter is a data length, and the memory management further comprises:
    determining the first data as belonging to the first type if the data length of the first data is greater than a length preset value, and
    determining the second data as belonging to the second type if the data length of the second data is not greater than the length preset value.

5. A memory storage device, comprising:
    a connection interface unit, configured to couple to a host system;
    a rewritable non-volatile memory module, wherein the rewritable non-volatile memory module comprises a plurality of physical erasing units; and
    a memory control circuit unit, coupled to the connection interface unit and the rewritable non-volatile memory module,
    wherein the memory control circuit unit is configured to retrieve at least one physical erasing unit from the physical erasing units as a first physical erasing unit for storing first data corresponding to a write command of a host system to the first physical erasing unit and marking the first physical erasing unit as belonging to a first group, wherein the first data belongs to a first type;
    wherein the memory control circuit unit is further configured to retrieve at least one physical erasing unit from the physical erasing units as a second physical erasing unit for storing second data corresponding to another write command of the host system to the second physical erasing unit and marking the second physical erasing unit as belonging to a second group, wherein the second data belongs to a second type different from the first type;
    wherein the memory control circuit unit is further configured to select a third physical erasing unit from the physical erasing units as an active physical erasing unit and marking the third physical erasing unit as belonging to the first group;
    when a garbage collecting operation is performed on the first physical erasing unit, the memory control circuit unit is further configured to move valid data of the first physical erasing unit to the third physical erasing unit among the physical erasing units if a valid data count of the first physical erasing unit is not less than a first preset value;

when the garbage collecting operation is performed on the first physical erasing unit, the memory control circuit unit is further configured to move the valid data of the first physical erasing unit to the fourth physical erasing unit if the valid data count of the first physical erasing unit is less than the first preset value;

when the garbage collecting operation is performed on the second physical erasing unit, the memory control circuit unit is further configured to move valid data of the second physical erasing unit to the fourth physical erasing unit if a valid data count of the second physical erasing unit is less than a second preset value; and when the garbage collecting operation is performed on the second physical erasing unit, the memory control circuit unit is further configured to move the valid data of the second physical erasing unit to the third physical erasing unit if the valid data count of the second physical erasing unit is not less than the second preset value.

6. The memory storage device of claim 5, wherein the memory control circuit unit is further configured to receive the first data from the host system and determine the first data as belonging to the first type or the second type according to a second parameter, and the memory control circuit unit is further configured to receive the second data from the host system and determine the second data as belonging to the first type or the second type according to the second parameter.

7. The memory storage device of claim 6, wherein the second parameter is one of a data length, a hit rate, a data state and an operating system behavior.

8. The memory storage device of claim 6, wherein the second parameter is a data length, the memory control circuit unit is further configured to determine the first data as belonging to the first type if the data length of the first data is greater than a length preset value, and the memory control circuit unit is further configured to determine the second data as belonging to the second type if the data length of the second data not being greater than the length preset value.

9. A memory control circuit unit for controlling a rewritable non-volatile memory module comprising a plurality of physical erasing units, the memory control circuit unit comprising:

a host interface, configured to couple to a host system, a memory interface, configured to couple to the rewritable non-volatile memory module; and a memory management circuit, coupled to the host interface and the memory interface;

wherein the memory management circuit is configured to retrieve at least one physical erasing unit from the physical erasing units as a first physical erasing unit for storing first data corresponding to a write command of a host system to the first physical erasing unit and marking the first physical erasing unit as belonging to a first group, wherein the first data belongs to a first type;

wherein the memory management circuit is further configured to retrieve at least one physical erasing unit from the physical erasing units as a second physical erasing unit for storing second data corresponding to another write command of the host system to the second physical erasing unit and marking the second physical erasing unit as belonging to a second group, wherein the second data belongs to a second type different from the first type;

wherein the memory management circuit is further configured to select a third physical erasing unit from the physical erasing units as an active physical erasing unit and marking the third physical erasing unit as belonging to the first group;

when a garbage collecting operation is performed on the first physical erasing unit, the memory management circuit is further configured to move valid data of the first physical erasing unit to the third physical erasing unit among the physical erasing units if a valid data count of the first physical erasing unit is not less than a first preset value;

when the garbage collecting operation is performed on the first physical erasing unit, the memory management circuit is further configured to move the valid data of the first physical erasing unit to the fourth physical erasing unit if the valid data count of the first physical erasing unit is less than the first preset value;

when the garbage collecting operation is performed on the second physical erasing unit, the memory management circuit is further configured to move valid data of the second physical erasing unit to the fourth physical erasing unit if a valid data count of the second physical erasing unit is less than a second preset value; and when the garbage collecting operation is performed on the second physical erasing unit, the memory management circuit is further configured to move the valid data of the second physical erasing unit to the third physical erasing unit if the valid data count of the second physical erasing unit is not less than the second preset value.

10. The memory control circuit unit of claim 9, wherein the memory management circuit is further configured to receive the first data from the host system and determine the first data as belonging to the first type or the second type according to a second parameter, and the memory management circuit is further configured to receive the second data from the host system and determine the second data as belonging to the first type or the second type according to the second parameter.

11. The memory control circuit unit of claim 10, wherein the second parameter is one of a data length, a hit rate, a data state and an operating system behavior.

12. The memory control circuit unit of claim 10, wherein the second parameter is a data length, the memory management circuit is further configured to determine the first data as belonging to the first type if the data length of the first data is greater than a length preset value, and the memory management circuit is further configured to determine the second data as belonging to the second type if the data length of the second data is not greater than the length preset value.

* * * * *